Figure 1:
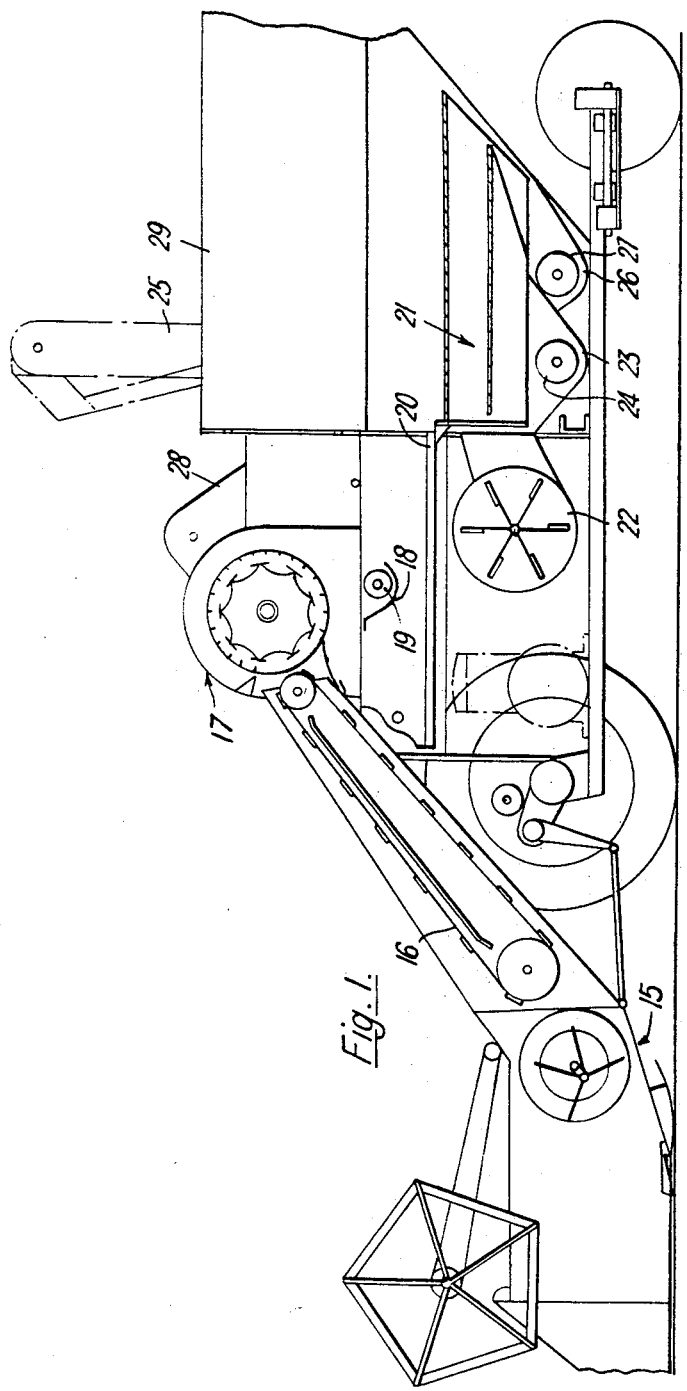

Inventor
FRANZ JOSEPH HERBSTHOFER
By
Tweedale & Gerhardt
Attorneys

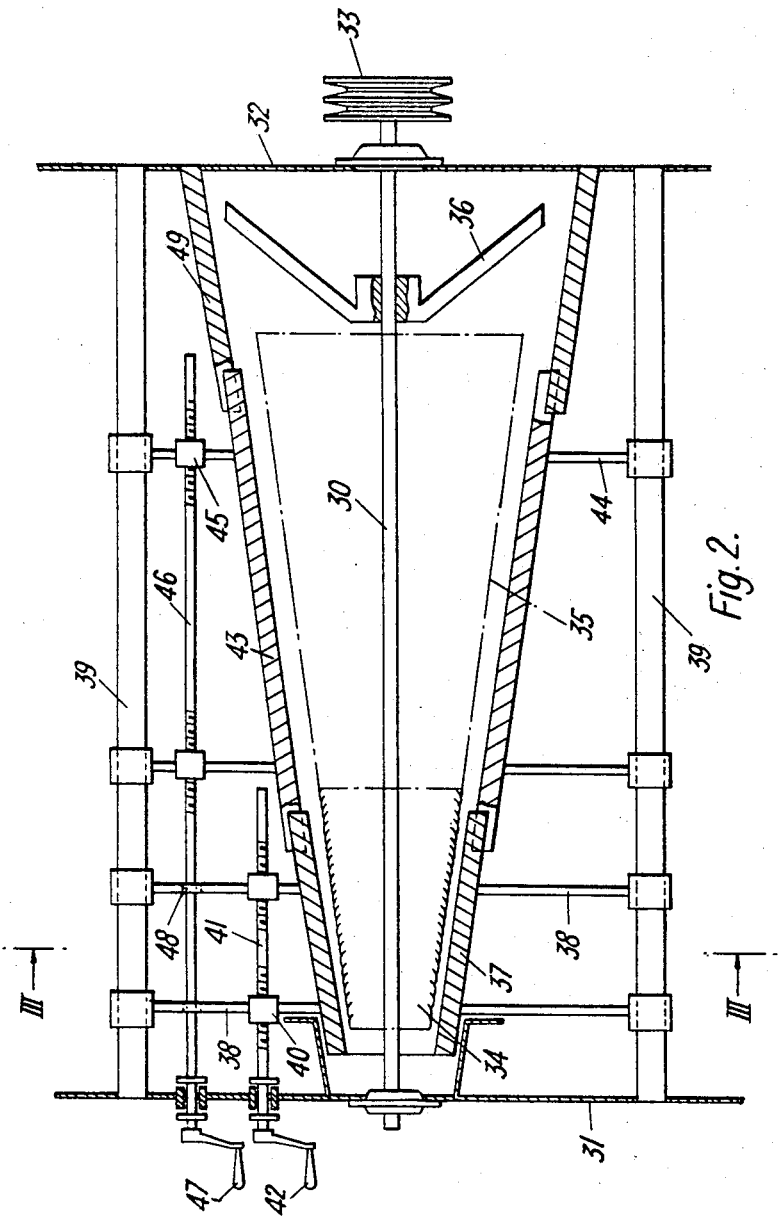

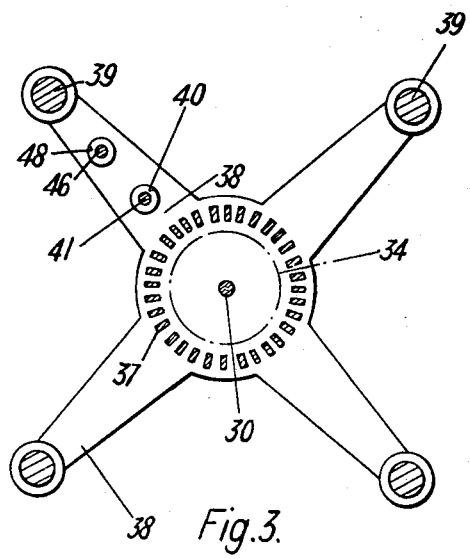

Nov. 12, 1968   F. J. HERBSTHOFER   3,410,270
ADJUSTABLE THRESHING ASSEMBLY
Filed Jan. 25, 1966   10 Sheets-Sheet 4

Inventor
FRANZ JOSEPH HERBSTHOFER

By Tweedale & Gerhardt
Attorneys

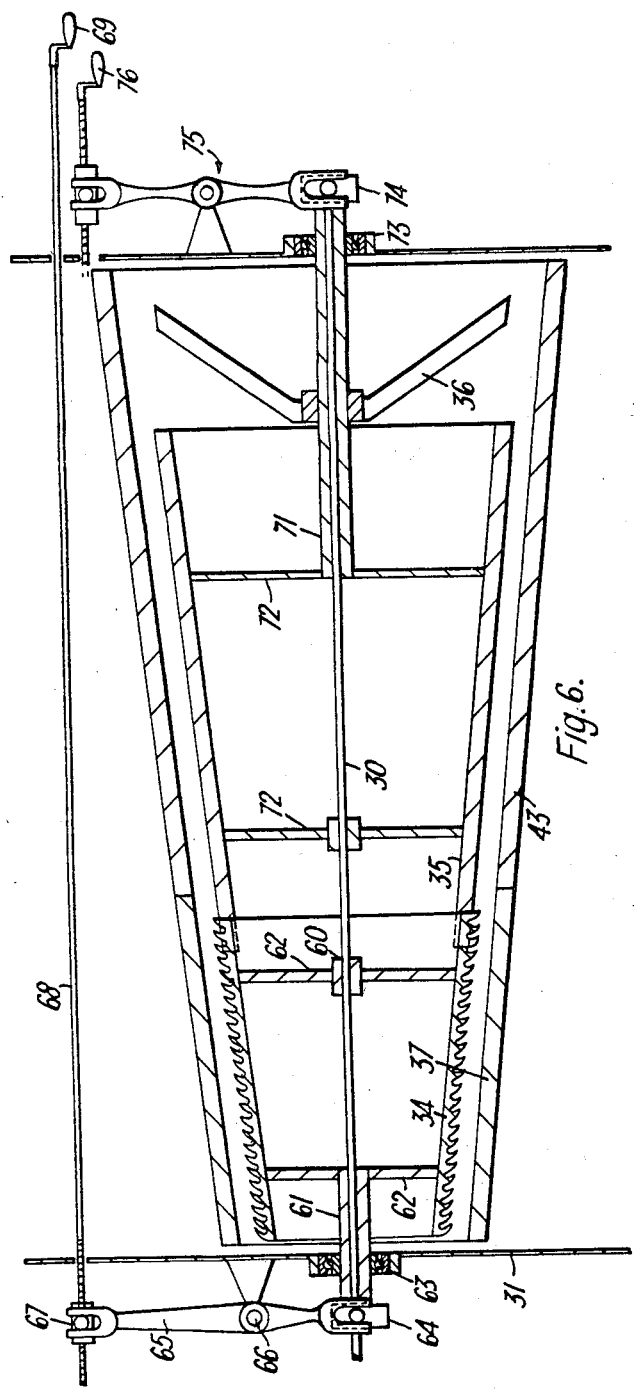

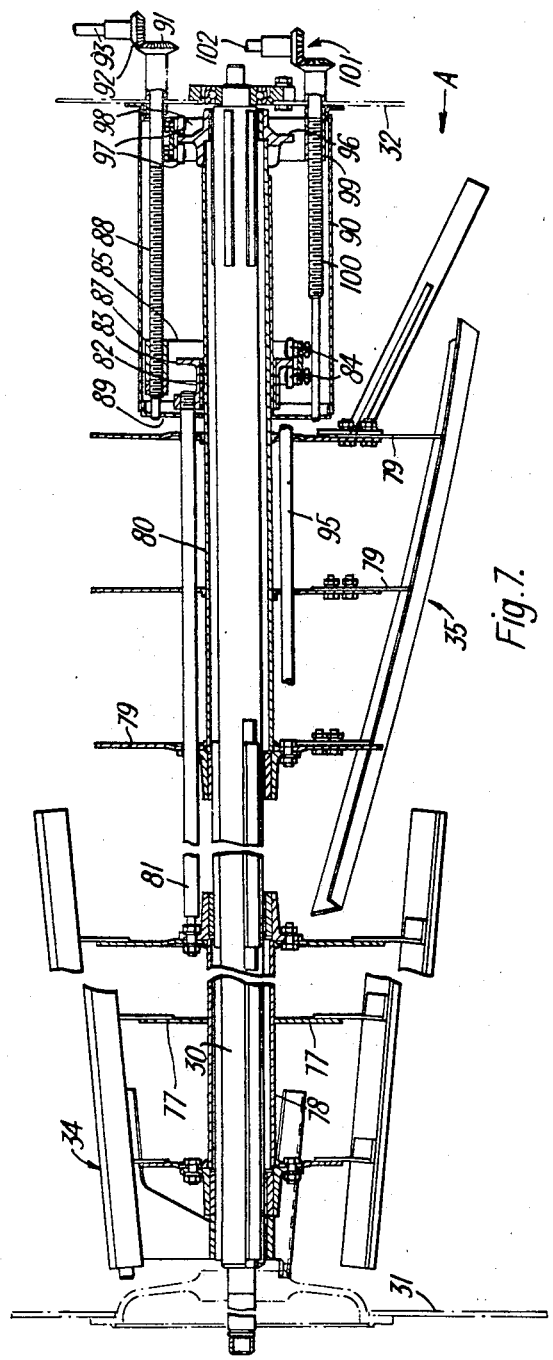

Nov. 12, 1968  F. J. HERBSTHOFER  3,410,270
ADJUSTABLE THRESHING ASSEMBLY
Filed Jan. 25, 1966  10 Sheets-Sheet 7

Inventor
FRANZ JOSEPH HERBSTHOFER

By
Tweedale & Gerhardt
Attorneys

Inventor
FRANZ JOSEPH HERBSTHOFER
By Tweedale & Gerhardt
Attorneys

United States Patent Office 3,410,270
Patented Nov. 12, 1968

3,410,270
ADJUSTABLE THRESHING ASSEMBLY
Franz Joseph Herbsthofer, Kassel-Harleshausen, Germany, assignor to Massey-Ferguson G.m.b.H., Kassel, Germany
Filed Jan. 25, 1966, Ser. No. 522,856
Claims priority, application Great Britain, Feb. 6, 1965, 5,270/65; Nov. 30, 1965, 50,710/65
21 Claims. (Cl. 130—27)

The invention relates to threshing and separating assemblies for removing grain or seed (hereinafter referred to simply as "grain") from cut crop. More specifically the invention relates to such assemblies in which the threshing and separating actions take place in a clearance zone between a rotary drum and a reaction member, both of which have a greater diameter at the region where the threshed and separated crop material is discharged than at the region where the crop is fed in. Such threshing and separating assemblies are generally, though not necessarily, used in combined harvesting and threshing machines (referred to hereinafter simply as "combines").

It is an object of the invention to provide for adjustment of such a threshing and separating assembly to take account of variations in the quantity, type or condition of crop being handled.

A threshing and separating assembly in accordance with a preferred embodiment of the invention includes a rotatable drive shaft, a threshing and separating drum mounted on said shaft and having a threshing section and a separating section, a reaction member surrounding said drum and having a concave surrounding said threshing section and a separating sieve assembly surrounding said separating section, a crop inlet in said concave, a crop outlet in said sieve assembly, said drum and said reaction member being of greater diameter at said outlet than at said inlet, said threshing section and said concave being mounted for axial movement relative to one another, and said separating section and said sieve assembly being mounted for axial movement relative to one another independently of relative movement of said threshing section and said concave.

Preferably, adjacent surfaces of the concave and threshing portion and of the sieve assembly and separating portion are mutually parallel, and the drum is frusto-conical in shape.

There may be provided adjustment means for automatically effecting relative axial movement of said separating portion and said sieve assembly in accordance with variations in the crop being handled.

Figure 5:
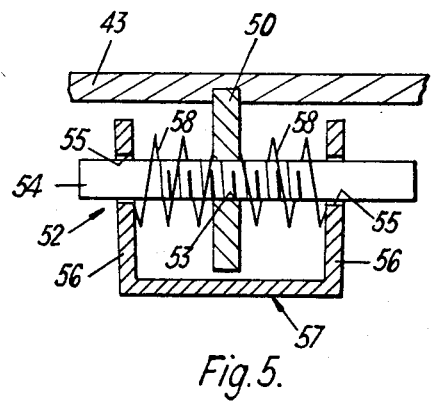
Figure 4:
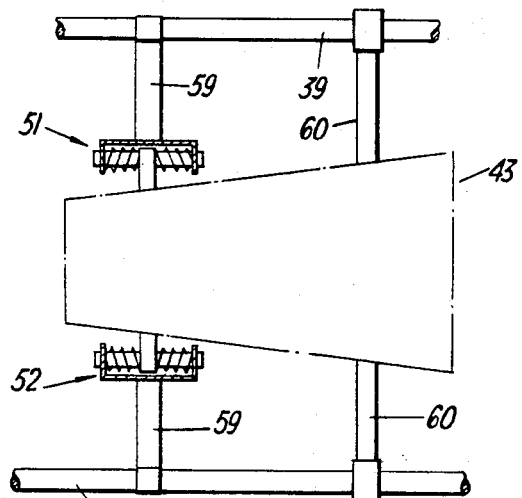
Figure 8:
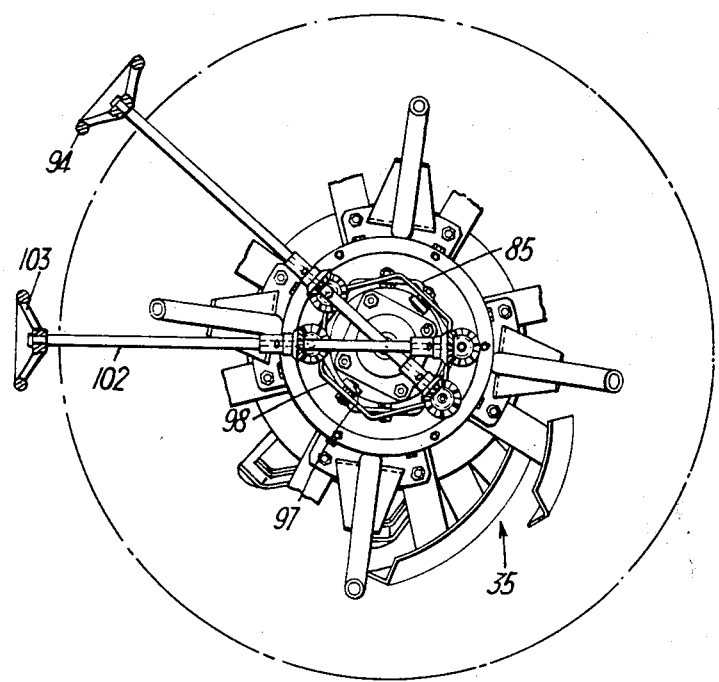
Figure 9:
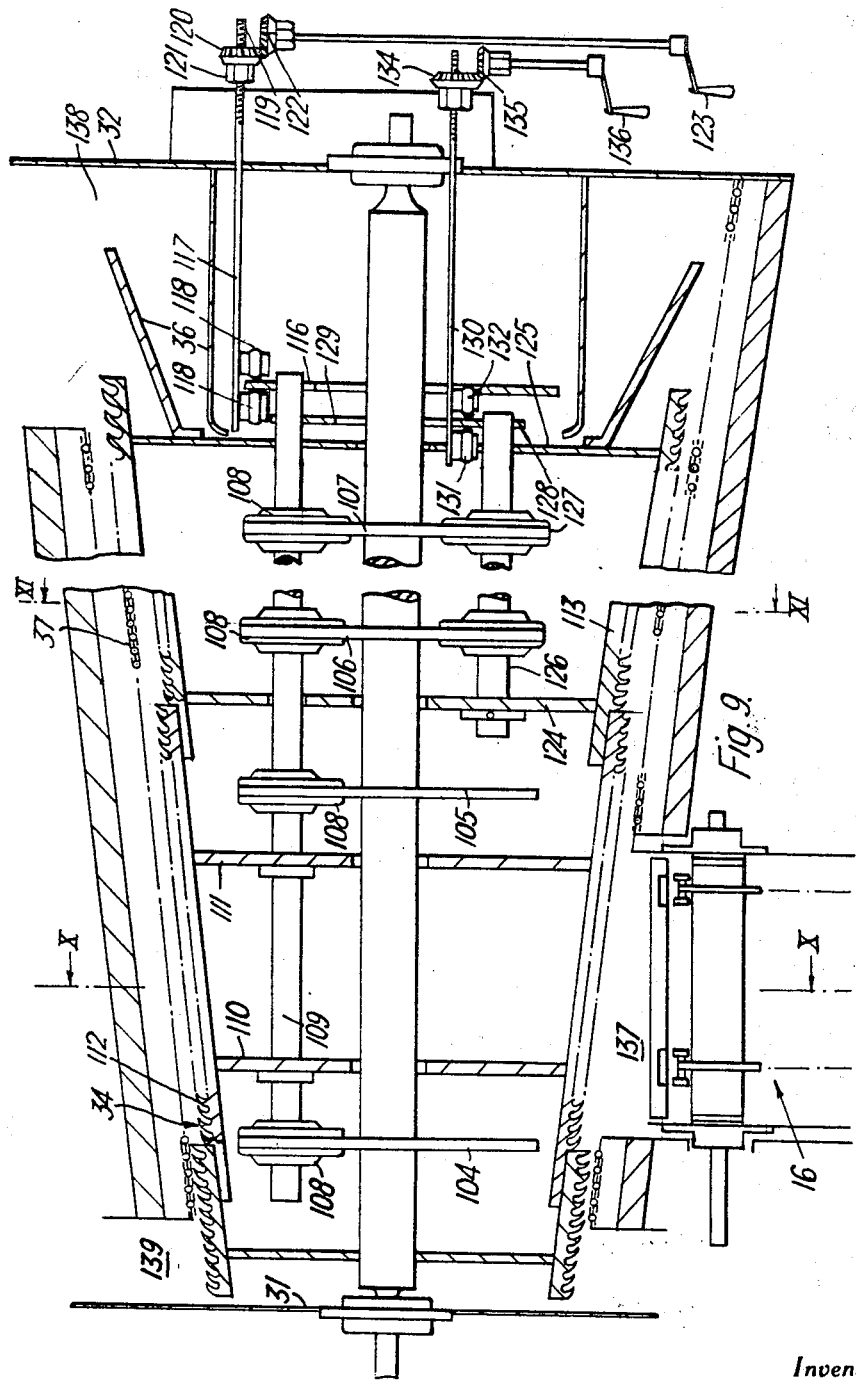
Figure 10:
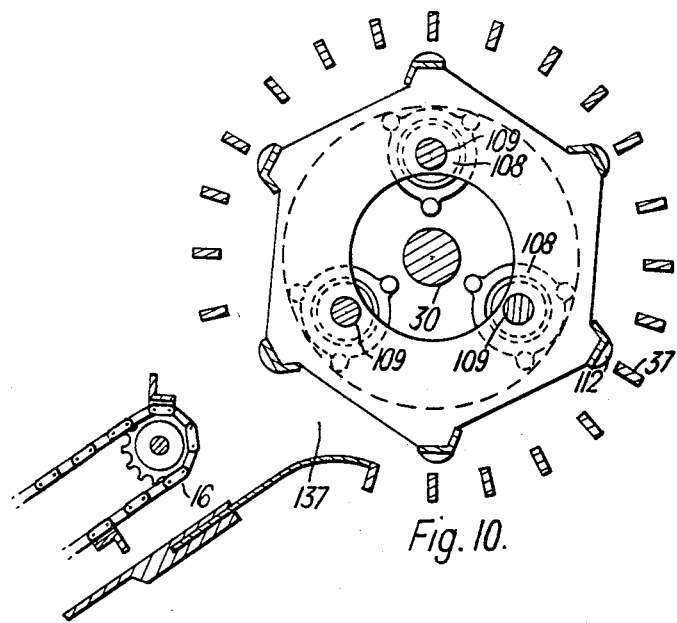
Figure 11:
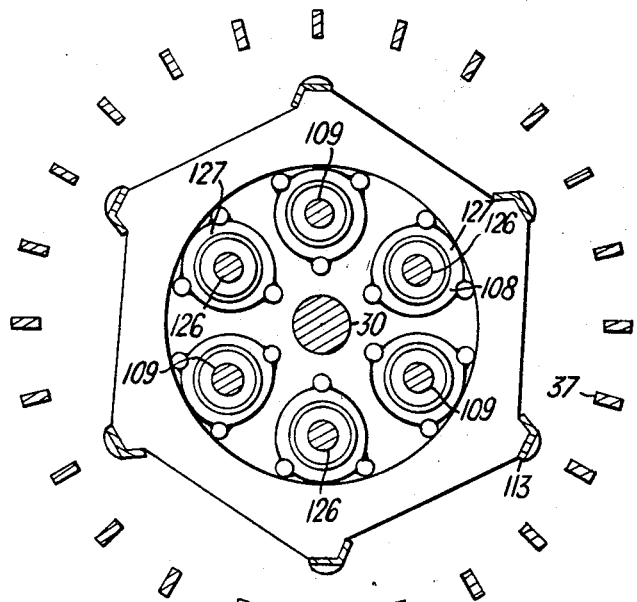
Figure 12:
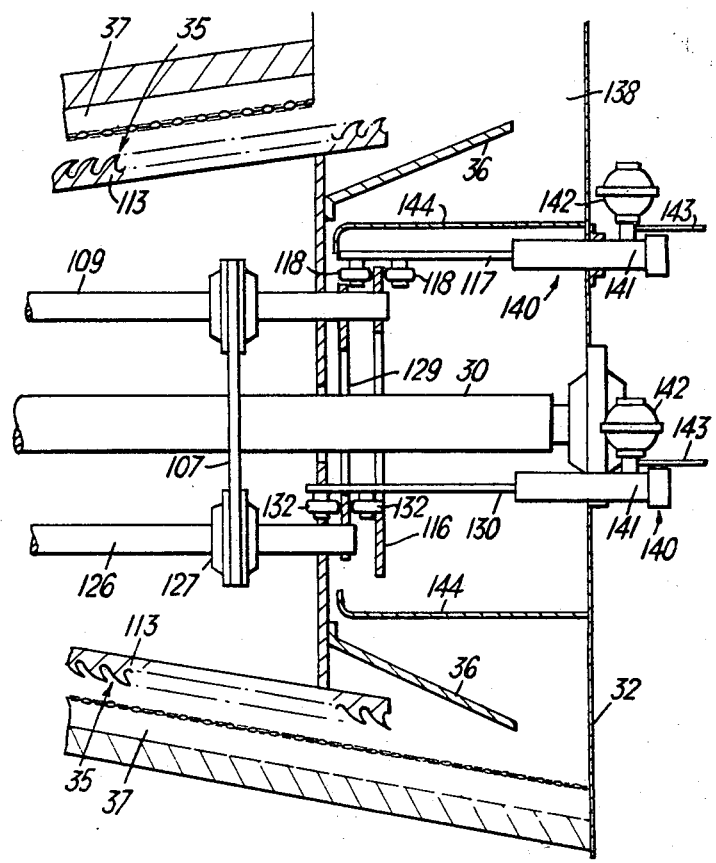

Embodiments of the invention will now be described by way of example only, with reference to the accompanying drawings, in which:

FIG. 1 is a diagrammatic cross-sectional elevation of a combine;
FIG. 2 is a diagrammatic cross-section through threshing and separating assembly;
FIG. 3 is a section on the line 3—3 in FIG. 2;
FIG. 4 is a diagrammatic cross-section of a second embodiment;
FIG. 5 is an enlarged view of a detail of FIG. 4;
FIG. 6 is a diagrammatic cross-section of a third embodiment;
FIG. 7 is a cross-section through a fourth embodiment;
FIG. 8 is a view in the direction of arrow A in FIG. 7;
FIG. 9 is a diagrammatic cross-section through a fifth embodiment;
FIG. 10 is a section on the line 10—10 in FIG. 9;
FIG. 11 is a section on the line 11—11 in FIG. 9; and
FIG. 12 is a fragmentary diagrammatic cross-section through a sixth embodiment.

Referring first to FIG. 1, there is shown a combine including a header unit 15 for cutting and collecting the cut crop and transferring it by means of a conveyor 16 to a threshing and separating assembly 17. This assembly threshes the crop and separates the grain from the straw, the latter passing out of the assembly to a chute which directs it to the ground. The threshed grain passes through the assembly and is collected in a trough 18 from which it is directed by an auger 19 onto a grain pan 20. The grain pan 20 conveys the grain to a cleaning mechanism including a shaker shoe assembly 21 and a fan 22 which serve to separate the grain from trash and chaff (known as "gleanings"). The cleaned grain is passed into a trough 23 from which it is delivered to the side of the machine by means of an auger 24 and then to a grain tank 29 by an elevator 25. Suitable means (not shown) is provided to unload the tank when it is full. The gleanings are collected in the trough 26 and delivered by an auger 27 to an elevator 28 which returns them to the threshing and separating assembly 17 for re-threshing.

The threshing and separating assembly is shown in detail in FIGS. 2 and 3. The assembly includes a rotatable shaft 30 journalled in spaced end supports 31 and 32 and adapted to be rotated by a pulley 33 mounted on one end of the shaft. A threshing and separating drum having a threshing section 34 and a separating section 35 is mounted on the shaft 30 and is of frusto-conical shape. A straw thrower 36 is mounted on the shaft 30 adjacent the large diameter end of the drum.

The threshing section 34 is surrounded by a threshing concave 37 which is carried by supports 38 slidably mounted on guide rods 39 disposed parallel to the shaft 30 and secured to the end supports 31 and 32. Internally threaded sockets 40 carried by the supports 38 are engaged by a threaded spindle 41 which may be manually rotated by a handle 42, such rotation moving the concave 37 axially of the shaft 30. Due to the frusto-conical shape of the concave 37 and the threshing section 34, such axial movement varies the radial distance between them.

The separating section 35 is surrounded by a separating sieve assembly 43 carried by supports 44 also slidably mounted on the guide rods 39. Sockets 45 similar to the sockets 40 are engaged by a threaded spindle 46 rotatable by a handle 47. Thus the separating sieve assembly may be moved axially of the shaft 30 in a similar manner to, and independently of, the concave 37. The spindle 46 passes through holes 48 in the supports 38 which carry the concave 37. The small diameter end of the separating sieve assembly 43 slidably overlaps the large diameter end of the concave 37. The concave 37 and the separating sieve assembly 43 together constitute a reaction member surrounding the drum.

In the illustrated embodiment, the cooperating surfaces of the threshing section and the concave end of the separating section and the separating sieve assembly are mutually parallel. However, it is within the scope of the invention that the surfaces can be nonparallel in order to maintain a uniform rate of flow of the material between the drum and the concave and sieve assembly surrounding the drum.

The threshing and separating assembly also includes a fixed separating sieve 49 carried by the end support 32 and also of frustro-conical shape, the small diameter end of the fixed separating sieve 49 slidably overlapping the large diameter end of the separating sieve assembly 43.

An inlet (not shown) for crop material is provided in the concave 37 at the small diameter end thereof and an outlet (not shown) is provided in the fixed separating sieve 49. During operation, straw is thrown through the outlet by the straw thrower 36.

A threshing and separating assembly including a threshing and separating drum having a threshing section with which a concave cooperates, a separating section surrounded by a separating sieve assembly, and a fixed separating sieve is shown in the co-pending U.S. application, Ser. No. 460,942, filed June 3, 1965.

In operation of the above-described embodiment, crop material to be threshed is introduced to the threshing section 34 of the drum through the inlet opening and is thrown against the concave 37 by rotation of the drum. Grain is thus thrashed out of the crop material and the grain and straw pass helically around and along the threshing section 34 of the drum to the separating section 35. Here the grain and straw are separated, the grain passing through the separating sieve assembly 43 and the straw moving helically around and along the separating section 35 of the drum to the fixed separating sieve 49 where further separation is effected. The straw is then thrown out of the outlet by the straw thrower 36.

During operation, the concave 37 and/or the separating sieve assembly 43 may be moved axially of the shaft 30 by rotation of the handle 42 or 47 respectively. Movement of the concave 37 alters the radial distance between same and the threshing section 34 of the drum and enables different crops to be effectively threshed. Movement of the separating sieve assembly 43 varies the radial distance between same and the separating section 35 of the drum. This affects the flow of straw since the smaller the distance between the separating section 35 of the drum and the separating sieve assembly 43, the thinner the straw mat and the quicker the straw movement. Thus, normally the separating sieve assembly 43 should be so positioned that the radial distance between it and the separating section 35 of the drum is the minimum which will accommodate the volume of straw being handled.

It should be noted that the radial distance between the concave 37 and the threshing section 34 of the drum is less than the radial distance between the separating sieve assembly 43 and the separating section 35 of the drum. Also the radial distance between the drum and the fixed separating sieve 49 is greater than that between the separating sieve assembly 43 and the drum. The stepped increase in the radial gap from the inlet to the outlet of the assembly, together with the construction of the drum, concave and sieves, ensures that only threshing action takes place in the threshing section and separating action in the separating sections.

In FIGS. 4 and 5 there is shown an arrangement for automatically adjusting the position of the separating sieve assembly 43 in accordance with the volume of crop material supplied. The outer surface of the separating sieve assembly 43 is provided with a peripheral slot (see FIG. 5) engaged by abutment members 50 forming part of automatic adjusting devices 51 and 52 (FIG. 4) disposed diametrically opposite one another adjacent the surface of the separating sieve assembly 43. Both devices 51 and 52 are the same and so one only will be described.

Each abutment member 50 is in the form of a lug including a screw-threaded aperture 53 engaged by a screwed rod 54 opposite ends of which pass through apertures 55 in spaced arms 56 of a U-shaped bracket or cage 57. Springs 58 are disposed around the rod 54 between the arms 56 and the abutment member 50 so that the abutment member is free to move against the action of one or other of the springs 58 relative to the cage 57, the latter being fixed to one of the guide rods 39 by a support 59.

In operation, forces acting between the separating section 35 of the drum and the separating sieve assembly 43, caused by increase or decrease of the volume of straw being handled, causes the separating sieve assembly 43 to move relative to the separating section 35 of the drum, and this movement is accommodated by the springs 58. The separating sieve assembly 43 is additionally supported by supports 60 slidable on the guide rods 39.

In a modification only one device 51 or 52 is provided, the other device being replaced by a support 60. In a further modification the cage 57 may be secured to the separating sieve assembly 43 and the abutment member 50 to the support 59.

The separating sieve assembly 43 and the fixed separating sieve 49 are preferably formed by circumferentially spaced bars connected by a series of circumferentially extending rods or wires. In a further modification the concave 37 may include a sieve portion similar to that shown in the aforementioned co-pending application, Ser. No. 460,942.

While in the embodiment of FIG. 3 a unitary threshing and separating drum is shown, the threshing and separating drum may be formed of two abutting drums, one forming the threshing section and the other the separating section.

The embodiment shown in FIG. 6 is similar in principle to that shown in FIG. 2 but the threshing and separating sections 34 and 35 of the drum are each independently axially slidable relative to the concave 37 and the separating sieve assembly 43 respectively. The threshing section 34 of the drum is supported on the shaft 30 by means of sleeves 60 and 61 and radial supports 62. The sleeve 61 is supported in bearings 63 in the end support 31 and passes therethrough to a bearing 64 which supports one end of the shaft 30 and is connected to one end of a lever 65 pivoted at 66 to the end support 31. The other end of the lever 65 carries an internally threaded sleeve or nut 67 rotatably engaged by a screw-threaded spindle 68 which may be rotated by a handle 69.

The separating section 35 of the drum is supported on the shaft 30 by sleeves 70 and 71 and radial supports 72. The sleeve 71 is supported in bearings 73 in the end support 32 and extends therethrough to a bearing 74 which supports the shaft 30 and is connected to a lever arrangement 75 similar to the lever 65, and operable by rotating a handle 76. The straw thrower 36 is carried on the sleeve 71 and the threshing and separating sections 34 and 35 of the drum slidably overlap one another at their inner ends.

In operation of this embodiment, the handles 69 and 76 may be rotated together or separately to move one section of the drum in an axial direction relative to the other section and hence vary the radial distance between one or both of the drum sections and the concave 37 or the separating sieve assembly 43, both the latter elements being fixed in this embodiment.

While in the embodiment just described the adjustment is effected by means of nut and spindle arrangements, adjustment could equally be effected by hydraulic rams or other convenient means.

FIGS. 7 and 8 show an embodiment similar to the FIG. 6 embodiment. End supports 31 and 32 support the drive shaft 30 and the threshing section 34 of the drum is carried on a series of flanges 77 on a sleeve shaft 78 which surrounds the shaft 30 and is slidably splined thereto. The separating section 35 of the drum is carried on a further series of flanges 79 on a further sleeve shaft 80 which also surrounds the shaft 30 and is splined thereto for sliding movement independently of sliding of the threshing section 34.

Adjustment means is provided for sliding the threshing section 34 axially of the shaft 30 and includes an operating rod 81 connected at one end to the flange 77 nearest the outlet end of the assembly and at the other end to a carriage 82 slidably supported on the sleeve shaft 80. Intermediate its ends the rod 81 passes through and is supported in the flanges 79. The carriage 82 has a peripheral flange 83 opposite faces of which are engaged by respective ones of pairs of rollers 84. During rotation of the drum, the rollers 84 rotate about their axes, but the axes themselves are stationary. The rollers 84 are mounted on a bracket 85 which surrounds the sleeve shaft 80 and carries internally screw-threaded sleeves 87. Screw-threaded rods 88 engage the sleeves 87 and are supported at opposite ends in bearings in the end support 32 and in an end cover 89 of a dust-proof housing 90. The rods 88 extend through the end support 32 and carry bevel gears 91 meshing with further bevel gears 92 on a shaft 93 manually rotatable by a handle 94 (FIG. 8).

The separating section 35 of the drum is provided with similar adjustment means including an operating rod 95, carriage 96, rollers 97, bracket 98, sleeves 99 and rods 100, operated through bevel gears 101 and a shaft 102 from manually rotatable handle 103.

In operation, either the threshing or the separating section or both may be axially adjusted along the shaft 30 by rotating the appropriate handles. For example, to adjust the threshing section 34, the handle 94 is turned, resulting in rotation of the shaft 93, bevel gears 92 and 91 and rods 88. The sleeves 87 ride along the rods 88 and move the bracket 85 and rollers 84 axially of the shaft 30. The rollers 84 thus move the carriage 82 axially of the shaft 30 through the flange 83 and thus the rods 81 and threshing section 34 also move axially. In this way the radial clearance between the threshing section 34 and the concave 37 is altered. Adjustment of the separating section is effected in a similar manner by turning the handle 103.

It is to be noted that the rollers 84 and 97 permit the drum to rotate while the elements of the adjustment means from the rollers to the handles are stationary. By virtue of this arrangement it is possible to effect adjustment during operation of the assembly as well as when the drum is stationary.

In the embodiment shown in FIGS. 9 to 11, the drive from the shaft 30 to the threshing and separating sections of the drum is modified. Thus four axially-spaced flanges 104, 105, 106 and 107 are secured to the drive shaft 30 and each flange carries a plurality of bearings 108 (FIGS. 10 and 11). Rods 109, which are parallel to the shaft 30, pass through aligned ones of the bearings 108 in the flanges 104 to 107. The rods 109 also pass through, and are rigidly attached to, annular flanges 110 and 111 which carry at their outer peripheries a series of spaced rasp bars 112 forming the threshing section 34 of the drum. A similar series of beater bars 113 mounted on flanges 114 and 115 form the separating section 35 of the drum.

The rods 109 project from one end of the drum and are connected by an annular flange plate 116. Adjustment means is provided including a control rod 117 carrying rollers 118 which contact one on each side of the flange plate 116 so that axial movement of the control rod will cause the rods 109, and hence the threshing section 34 of the drum, to move axially of the drive shaft 30. The control rod 117 is threaded at its outer end 119, and a bevel gear 120 mounted on a nut 121 is rotatable through a further bevel gear 122 and handle 123. Thus rotation of the handle 123 causes movement of the control rod 117 to adjust the position of the threshing section 34 of the drum axially of the shaft 30, thus altering the radial clearance between the rasp bars 112 and the concave 37.

The beater bars 113 are similarly connected to the shaft 30 through annular flanges 124 and 125 which are rigidly attached to a second set of rods 126 passing through bearings 127 in the flanges 106 and 107. This second set of rods are also interconnected at one end by an annular flange plate 128, which has cut-away portions 129 to allow passage of the first set of rods 109. Similar adjustment means including a control rod 130, rollers 131, 132 contacting the flange plate 128, bevel gears 134, 135 and a handle 136, is provided to adjust the separating section 35 of the drum axially of the shaft 30.

In this embodiment the drive to the threshing and separating sections of the drum is taken from the shaft 30 through the flanges 104 to 107, bearings 108 and 127 and annuar flanges 110, 111, 124 and 125 to the rasp and beater bars 112 and 113. Thus all sliding movement for axial adustment is by the rods 109 and 126 passing through the bearings 109 and 127 respectively. To prevent wear these bearings are preferably sealed against the entry of dust and dirt and to be service free may be made from brass, plastic or other non-corrosive material. The sections of the drums are not directly connected by splines or the like to the central drive shaft 30 so that the latter requires, over at least the major portion of its length, very little or no machining, and may therefore be made of relatively cheap material.

Material is introduced into the clearance between the threshing section 34 of the drum and the concave 37 through an inlet opening 137 adjacent the small diameter end of the assembly. The coveyor 16 terminates adjacent the opening 137. Straw is thrown out of the assembly by the straw thrower 36 through an outlet opening 138 adjacent the large diameter end of the assembly. The "gleanings" are fed back into the assembly through an opening 139.

The embodiment shown in FIG. 12 is generally similar in construction to the embodiment of FIGS. 9 to 11, but a modified adustment means is provided. Thus, the control rods 117 and 130 form the piston rods of hydraulic piston and cylinder actuators 140 supported in the end support 32. The cylinders 141 of the actuators are connected to hydraulic reservoirs or accumulators 142 supplied with hydraulic fluid through a conduit 143. A housing 144 is provided, which is similar to the housing 90 in the FIGS. 7 and 8 embodiment, and prevents straw, grain, chaff or dust from the straw thrower 36 from becoming entangled with the rollers 84 and 97 or the actuators 140 or from becoming wrapped around the shaft 30.

The adjustment means of this embodiment operates automatically. Thus, in operation, the force of the crop material in the clearance between the drum and the concave 37 or the separating sieve assembly 43 tends to urge the drum sections towards the large diameter end of the assembly against the pressure of fluid in the actuators 140. These pressures are set to selected initial values which maintain a desired clearance for a given quantity of crop supplied, and thereafter, if the quantity increases, the drum sections are forced to the right in FIG. 12 against the pressure of fluid in the actuators 140 to increase the clearance. The pressures in the actuators 140 thus rise and produce gradually increasing resistances to rightward movement of the drum sections. Conversely, if the quantity of crop falls, the pressure of fluid in the actuators 140 pushes the drum sections to the left in FIG. 12 to reduce the clearance, the pressure of the fluid in the actuators 140 falling. Stops may be provided to limit the leftward movement and hence define the minimum clearance. Thus the actuators 140 act as "hydraulic springs."

In a modification the accumulators 142 may be replaced by any suitable substantially constant pressure source connected to the cylinders 141, such as a constant pressure relief valve or system of valves. The aforementioned stops for fixing the minimum clearances in the threshing and separating sections could be related to the axial positions of the drum sections in such a way that the clearance in the separating section was never less than that in the threshing section.

All the above embodiments may be modified by substitution of drums or drum sections in which the sloping surface is convex or concave or one or more of the drum sections is part cylindrical and part conical.

By virtue of all the above embodiments, the clearances between the threshing section 34 of the drum and the concave 37 and between the separating section 35 of the drum and the separating sieve assembly 43 may be adusted independently of one another to suit different quantities, types or conditions of crop, and such adjustment may be carried out during operation of the assembly. In those embodiments where the adjustments take place automatically, they will do so to allow for the passage of an obstruction, such as a stone, through the assembly without damaging the drum sections, the concave or the separating sieve assembly.

I claim:
1. A threshing and separating assembly including rotatable drive shaft, a threshing and separating drum mounted on said shaft and having a threshing section and a separating section, a reaction member surrounding said drum and having a concave surrounding said threshing section and a separating sieve assembly surrounding said separating section, a crop inlet in said concave, a crop outlet in said sieve assembly, said drum and said reaction member being of greater diameter at said outlet than at said inlet, said threshing section and said concave being mounted for axial movement relative to one another, and said separating section and said sieve assembly being mounted for axial movement relative to one another independently of relative movement of said threshing section and said concave.

2. A threshing and separating assembly according to claim 1 in which adjacent surfaces of said concave and said threshing portion and of said sieve assembly and said separating portion are mutually parallel.

3. A threshing and separating assembly according to claim 2 in which said drum is frusto-conical in shape.

4. A threshing and separating assembly according to claim 1 including adjustment means for automatically effecting relative axial movement of said separating portion and said sieve assembly in accordance with variations in the crop being handled.

5. A threshing and separating assembly according to claim 1 including a framework, first support means slidably supporting said concave on said framework, second support means slidably supporting said sieve assembly on said framework, and adjustment means operable to slide said concave and said sieve assembly independently of one another relative to said framework and to said drum.

6. A threshing and separating assembly according to claim 5 in which said adjustment means includes a pair of screw-threaded rods rotatably mounted in said framework and screw-threadedly engaged with said first and second support means respectively, said rods being independently rotatable by manual means to slide the associated support means and hence said concave or said sieve assembly relative to said framework.

7. A threshing and separating assembly according to claim 4 including a framework, support means rigidly connected to said framework, and cooperable attachment means rigidly connected to said sieve assembly, said adjustment means being interposed between said support means and said attachment means and forming an inextensible connection therebetween in a direction radially of said sieve assembly, but permitting restrained sliding movement of the latter relative to said framework in a direction axially of said sieve assembly.

8. A threshing and separating assembly according to claim 7 in which said adjustment means incorporates slidably interconnected members respectively carried by said support means and said sieve assembly, and double-acting resilient means interposed between said members to permit, but gradually increase resistance to, axial sliding movement of said sieve assembly in both directions.

9. A threshing and separating assembly according to claim 8 in which said slidably interconnected members are a U-shaped bracket and a lug, the latter carrying an axially extending rod opposite ends of which project from opposite sides of the lug and are slidably engaged in apertures in the legs of said U-shaped bracket, and a pair of coil springs mounted one on each end of said rod and each acting between one side of said lug and one leg of said U.

10. A threshing and separating assembly according to claim 1 including a framework rigidly supporting said reaction member, a sleeve slidably mounted on said drive shaft and supporting said threshing section, a sleeve slidably mounted on said drive shaft and supporting said separating section, and adjustment means operable to slide said sleeves axially of said shaft independently of one another, whereby said threshing section or said separating section is moved axially of said reaction member.

11. A threshing and separating assembly according to claim 10 in which separate adjustment means is provided for each of said sections, each adjustment means including a bearing one race of which is connected to the appropriate one of said sleeves and the other race of which is pivoted to one end of a lever pivotally mounted intermediate its ends on said framework and pivotally connected at its other end to a screw threaded member engaged by a screw threaded rod supported in said framework and rotatable by manual means.

12. A threshing and separating assembly according to claim 10 in which separate adjustment means is provided for each of said sections and includes a carriage mounted on said drive shaft, a connection between said carriage and the appropriate one of said sleeves, a radial flange on said carriage, a pair of rollers engaging one on each side of said flange, and having their axes substantially radial to said shaft, a bracket on which said rollers are carried, and means for moving said bracket axially of said shaft.

13. A threshing and separating assembly according to claim 12 in which said means for moving said bracket includes a rod extending parallel to said shaft and screw-threadedly engaged with a socket carried by said bracket, and means for rotating said rod.

14. A threshing and separating assembly according to claim 1 in which each section of said drum is mounted on said drive shaft through support means secured to said drive shaft for rotation therewith and rod means mounted in said support means for sliding movement axially of said drive shaft and supporting said section of the drum co-axially with said drive shaft, there being adjustment means for moving said rod means and hence said section of the drum axially of said shaft.

15. A threshing and separating assembly according to claim 14 in which said adjustment means includes an annular flange carried by said rod means for rotation therewith and co-axially of said shaft, a pair of rollers engaging one on each side of said flange and having their axes substantially radial to said shaft, and means permitting movement of said rollers axially of said shaft.

16. A threshing and separating assembly according to claim 15 in which said means permitting movement of said rollers is a rod extending parallel to said shaft and carrying the axes of said rollers, a screw-thread formed on said rod, a first bevel gear screw-threadedly engaging said screw-threaded portion of said rod and a further bevel gear meshing with said first bevel gear and rotatable by manual means.

17. A threshing and separating assembly according to claim 15 in which said means permitting movement of said rollers is a rod extending parallel to said shaft and carrying the axes of said rollers, a piston formed on said rod, a cylinder in which said piston is slidably disposed, and a source of hydraulic fluid at substantially constant pressure communicating with said cylinder.

18. A threshing and separating assembly according to claim 1 in which said threshing section of said drum has a peripheral surface defined by a series of circumferentially-spaced rasp bars.

19. A threshing and separating assembly according to claim 1 in which said separating section of said drum has a peripheral surface defined by a series of circumferentially-spaced beater bars.

20. A threshing and separating assembly according to claim 1 including stop means limiting movement of said sections in a direction towards the small-diameter end of the assembly.

21. A threshing and separating assembly including threshing means and separating means each mounted for rotation about a common axis, reaction means surrounding said threshing means and separating means and having a concave surrounding said threshing means and a separating sieve assembly surrounding said separating means, a crop inlet in said concave, a crop outlet in said sieve assembly, and said threshing means and concave being axially movable relative to each other.

References Cited

UNITED STATES PATENTS

| | | | |
|---|---|---|---|
| 3,212,243 | 10/1965 | Mark et al. | 56—21 |
| 3,245,208 | 4/1966 | Mark et al. | 56—21 |
| 3,306,302 | 2/1967 | Mark et al. | 130—27.8 |

ANTONIO F. GUIDA, *Primary Examiner.*